(12) United States Patent
Chiussi et al.

(10) Patent No.: US 6,396,843 B1
(45) Date of Patent: May 28, 2002

(54) METHOD AND APPARATUS FOR GUARANTEEING DATA TRANSFER RATES AND DELAYS IN DATA PACKET NETWORKS USING LOGARITHMIC CALENDAR QUEUES

(75) Inventors: Fabio Massimo Chiussi, Long Branch; Andrea Francini, Eatontown; Joseph George Kneuer, Fair Haven, all of NJ (US)

(73) Assignee: Agere Systems Guardian Corp., Allentown, PA (US)

( * ) Notice: Subject to any disclaimer, the term of this patent is extended or adjusted under 35 U.S.C. 154(b) by 0 days.

(21) Appl. No.: 09/182,884

(22) Filed: Oct. 30, 1998

(51) Int. Cl.[7] .............................................. H04L 12/28
(52) U.S. Cl. ...................................... 370/418; 370/389
(58) Field of Search ................................. 370/395, 389, 370/412, 414–418, 422, 468

(56) References Cited

U.S. PATENT DOCUMENTS

| | | | |
|---|---|---|---|
| 5,471,631 A | * 11/1995 | Beardsley et al. | 713/502 |
| 5,689,506 A | * 11/1997 | Chiussi et al. | 370/388 |
| 5,859,835 A | * 1/1999 | Varma et al. | 370/229 |
| 6,021,116 A | * 2/2000 | Chiussi et al. | 370/236 |
| 6,064,650 A | * 5/2000 | Kappler et al. | 370/232 |
| 6,075,791 A | * 6/2000 | Chiussi et al. | 370/412 |
| 6,134,217 A | * 10/2000 | Stiliadis et al. | 370/232 |

* cited by examiner

Primary Examiner—David R. Vincent
(74) Attorney, Agent, or Firm—Mayer Fortkort & Williams, PC; Stuart H. Mayer, Esq.

(57) ABSTRACT

The total implementation complexity of packet schedulers which aim at approximating the Generalized Processor Sharing (GPS) policy is the combination of the complexity of their system-potential function and the complexity involved in sorting the timestamps in order to select the packet with minimum timestamp for transmission. Given that several scheduling algorithms which use a system-potential function of O(1) complexity have been introduced (among them, the Minimum-Delay Self-Clocked Fair Queuing (MD-SCFQ) algorithm achieves optimal delay and excellent fairness properties), the major contribution to the total complexity comes from the task of sorting the timestamps every time a packet is transmitted or received, which is common to all GPS-related schedulers. A method and an apparatus, called the Logarithmic Calendar Queue (LCQ), is disclosed which can achieve a dramatic reduction of the implementation complexity of sorting the timestamps in a GPS-related scheduler, at the cost of very small and controllable degradation of the guaranteed delay bounds. This is achieved by using a plurality of calendar subqueues, each subqueue associated with different granularity for the representation of timestamp values.

30 Claims, 11 Drawing Sheets

US 6,396,843 B1

METHOD AND APPARATUS FOR GUARANTEEING DATA TRANSFER RATES AND DELAYS IN DATA PACKET NETWORKS USING LOGARITHMIC CALENDAR QUEUES

RELATED APPLICATIONS

The present invention is related to and claims the benefit of U.S. Provisional Application No. 60/064,082 and entitled "Method and Apparatus for Guaranteeing Data Transfer Rates and Delays in Data Packet Networks Using Logarithmic Calendar Queues", filed Nov. 3, 1997.

The present invention is also related to U.S. patent application Ser. No. 08/959,362, filed on Oct. 28, 1997 and entitled "A System for Guaranteeing Data Transfer Rates and Delays in Packet Networks," which is hereby incorporated by reference as if repeated herein in its entirety, including the drawings.

FIELD OF THE INVENTION

The present invention relates to methods and apparatuses for sorting timestamps in packet networks, and more particularly to a method and an apparatus for sorting timestamps in a system for scheduling packets in a packet network to guarantee data transfer rates to a data source and data transfer delays from a data source to a destination.

BACKGROUND OF THE INVENTION

The implementation of Per-Virtual-Connection (Per-VC) schedulers which aim at approximating the Generalized Processor-Sharing (GPS) policy, as described in A. K. Parekh and R. G. Gallager, "A Generalized Processor-Sharing Approach to Flow Control in Integrated Services Networks: The Single-Node Case," IEEE/ACM TRANSACTIONS ON NETWORKING, June 1993, pp. 344–357, which is incorporated herein by reference, is a central issue in next-generation switching systems for broadband packet networks, such as Asynchronous Transfer Mode (ATM) switches and Internet Protocol (IP) routers. In a market arena in which the cost targets are precipitously dropping, it is desirable to minimize the complexity involved in schedulers, and to make the cost differential with respect to systems with less sophisticated scheduling as small as possible.

The total implementation complexity of these GPS-related scheduling algorithms is a combination of the complexity of the function used as the system potential to compute the timestamps for the packets in the system, and the complexity involved in sorting the timestamps in order to select the packet with the minimum timestamp for transmission.

In recent years, several scheduling algorithms have been introduced, which algorithms use a system-potential function of minimal complexity. Examples are Self-Clocked Fair Queuing (SCFQ), as described in S. J. Golestani, "A Self-Clocked Fair Queuing Scheme for Broadband Applications," PROCEEDINGS OF INFOCOM '94, April 1994, pp. 636–646, which is incorporated herein by reference; Virtual Clock (VC), as described in L. Zhang, "Virtual Clock: A New Traffic Control Algorithm for Packet Switching," ACM TRANSACTIONS ON COMPUTER SYSTEMS, May 1991, pp. 101–124, which is incorporated herein by reference; Frame-based Fair Queuing (FFQ), as described in D. Stiliadis and A. Varma, "Design and Analysis of Frame-based Fair Queuing: A New Traffic Scheduling Algorithm for Packet-Switched Networks," PROCEEDING OF SIGMETRICS '96, May 1996, pp. 104–115, which is incorporated herein by reference; and Minimum-Delay Self-Clocked Fair Queuing (MD-SCFQ), as described in F. M. Chiussi and A. Francini, "Minimum-Delay Self-Clocked Fair Queuing Algorithm for Packet-Switched Networks," PROCEEDINGS OF INFOCOM '98, March 1998, which is incorporated herein by reference. In particular, among these algorithms, MD-SCFQ achieves both optimal delay properties and excellent fairness properties.

Given that scheduling algorithms achieving the desired performance with a system-potential function of minimal complexity are available, the major contribution to the total complexity comes from the sorting of timestamps to select which packet to serve, an operation that is common to all GPS-related schedulers and one that has to be performed every time a packet is transmitted or received.

The number of timestamps that have to be sorted is equal to the number of connections V supported by the scheduler. As an example, typical values of V in current ATM switches are in the tens of thousands of connections. The range of possible values that the timestamps can assume at any given time depends on the ratio between the maximum and minimum service rates that the scheduler is required to provide to the connections, and is typically very wide. Given the complexity of sorting a large number of timestamps over a wide range of possible values at the high speeds of interest in broadband packet networks, data structures that are specifically devised to be efficiently mapped into silicon must be used to make hardware implementation affordable. One popular technique to implement the sorting structure is the so-called calendar queue, which consists of an ordered collection of bins, one bin for each possible value of timestamp. The sorting of the timestamps occurs by physically separating the timestamps in the corresponding bins, and visiting the bins in order. The calendar queue uses a direct relation between position in memory and value of the timestamps to simplify the data structure required to perform the sorting. In the particular case of ATM networks, the granularity of interest to represent the timestamps is the timeslot, equal to the duration of transmission of a cell on a link. Accordingly, the calendar queue, to accurately implement the sorting in a GPS-related scheduler, should provide one bin per timeslot, and have as many bins as necessary to cover the possible range of values of the timestamps at any given time; again, with what is typical in current ATM switches, the required size of the calendar queue is very large and, consequently, the scheduler is still expensive. Similar considerations apply to data packet networks based on other technologies, such as IP networks.

To reduce the cost of the scheduler, approximations can be introduced to simplify the sorting task. Such approximations may negatively affect the delay properties of the initial scheduler. The challenge, of course, is to devise techniques that are simple to implement and introduce minimal degradation. A possible approach, as described in J. L. Rexford, A. G. Greenberg, and F. G. Bonomi, "Hardware-Efficient Fair Queuing Architectures for High-Speed Networks," PROCEEDINGS OF INFOCOM '96, pp. 120–128, which is incorporated herein by reference, is to increase the granularity with which timestamps are represented and thus reduce the number of bins in the calendar queue accordingly. In a scheme such as SCFQ, which achieves delay bounds that are far from optimal, especially for connections with high service rate, the degradation introduced by the increased granularity is, after all, not that noticeable. In case of schemes such as FFQ and MD-SCFQ, which achieve optimal delay bounds and are therefore more desirable, such a technique would basically compromise those delay bounds, and in particular heavily penalize the high-rate connections.

The present invention relates to a method and an apparatus for sorting timestamps in a system for scheduling the transmission of data packets in a packet-switched network, which guarantees data transfer rates to data sources and data transfer delays from data sources to destinations and is cost-efficient to implement.

SUMMARY OF THE INVENTION

The present invention provides a technique to reduce the implementation cost of the sorting mechanism, which technique we have called the Logarithmic Calendar Queue (LCQ). The LCQ consists of a small ordered set of short calendar subqueues, in which the subqueues use bins of progressively increasing granularity. The name chosen for the technique comes from the fact that the set of subqueues can be viewed as a single calendar queue in which the granularity of the bins used to sort the timestamps increases logarithmically with the distance of the timestamps from the system potential at the time when they are computed. The LCQ increases the granularity in an optimal way, so that the relative degradation in delay bounds is very small and is the same for any connection, regardless of its service rate. Using the LCQ, the reduction in memory requirements, and consequently in cost, to implement the calendar queue is dramatic (e.g., three orders of magnitude in a typical scenario of a scheduler for a 622 Mbps link in a current ATM switch).

DETAILED DESCRIPTION OF THE INVENTION

Figure 1:
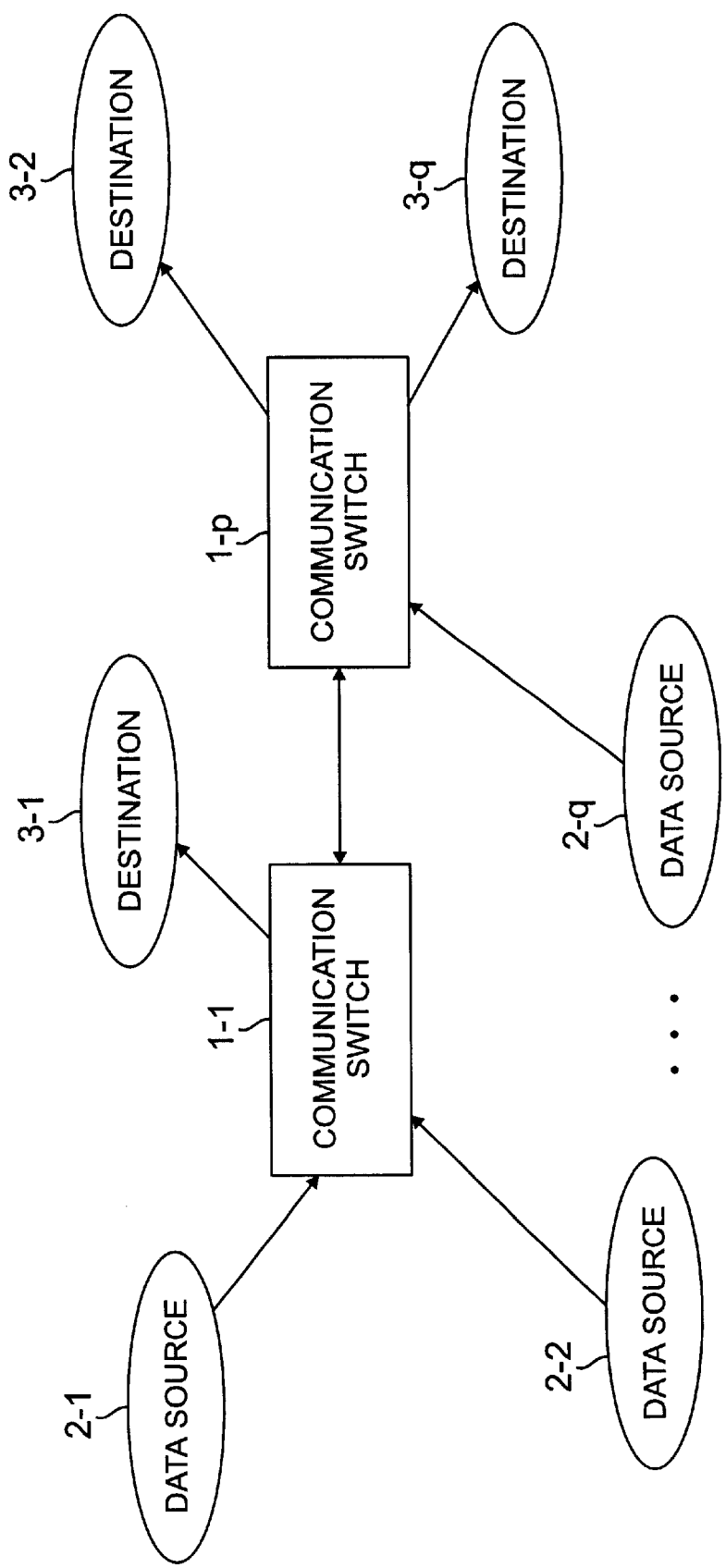
FIG. 1 depicts a packet network in which a number of switches, data sources and destinations are connected.

The present invention relates to a technique for reducing the implementation complexity of a GPS-related scheduler. It should be understood that, although herein we explicitly describe the present invention for sorting timestamps for a specific GPS-related scheduler (MD-SCFQ) in a specific network context (ATM), the present invention can be applied to sort timestamps for any GPS-related scheduler in any packet network.

Background: Overview of Implementation Issues

First, a discussion of the implementation issues and techniques related to the implementation of GPS-related schedulers in ATM systems is necessary. Since in ATM all packets, referred to as cells, have the same size (equal to 53 bytes), we consider the time axis as slotted, with slots (referred to as timeslots) of size equal to the duration of the transmission of a cell on a link. Without any loss of generality, a single timeslot governing the whole ATM system can be assumed, with arrivals and transmissions of cells as synchronized to this common timeslot. The occurrence of any event (e.g., the arrival or the transmission of a cell) is associated with the timeslot during which the event is completed (the arrival/transmission of a cell is completed when the last unit of information of the cell arrives at/leaves from the system). The transmission delay of a cell is defined as the distance between the timeslot of arrival of the cell and the timeslot of its transmission. As a result, the transmission delay of a cell is always an integer and can never be less than one timeslot. Similarly, one can express all service rates in terms of cells per timeslot, so that the constant service rate r of the server is by construction equal to one cell per timeslot, and the reserved service rate $r_i$ of any connection i is bounded as $0 \leq r_i \leq 1$, with the condition $\Sigma_i r_i \leq r$. Throughout this application, the terms connection and session are used interchangeably.

Two terms contribute to the total implementation complexity of a GPS-related scheduling algorithm: (i) the complexity of computing its system-potential function, and (ii) the complexity involved in sorting the timestamps in order to select the cell with the minimum timestamp for transmission. Several scheduling algorithms which use a system-potential function of O(1) complexity are known. In particular, among these algorithms, MD-SCFQ achieves both optimal delay bounds and excellent fairness properties. Thus, using the system-potential function of MD-SCFQ, the contribution of the first term to the implementation complexity is minimal. On the contrary, the contribution of the second term is substantial.

A first well-known simplification comes from the observation that all schedulers assign increasing values of timestamp to consecutive cells that belong to the same session, so that for each session only the timestamp of the cell at the head of the corresponding cell queue must be considered in the selection process. (In more general terms, for all the GPS-related schedulers of interest, in any data packet network, even the computation and storage of the timestamp is required only for the packet at the head of the queue of each session at any time; such a timestamp is referred to as the session timestamp.)

Despite this important reduction in the size of the problem, the maximum number of sessions that can be active simultaneously is still very large, and in general equal to the maximum number V of sessions that the server can support (typically, tens of thousands of sessions may have to be supported in practice). The requirement is that the sorting and the selection of the minimum timestamp be performed every timeslot. Clearly, at the high speeds of interest in ATM, the complexity of the sorting mechanism is an important practical issue in these systems. To make GPS-related schedulers affordable, sorting structures that are specifically devised to be efficiently mapped into silicon must be used. Even with such specialized structures, the implementation costs may still be too high, and techniques to further reduce complexity are necessary. Different approaches are possible for this purpose. In some cases, the specific properties of a scheduler can help in simplifying the selection process. It is also possible to introduce approximations in the scheduling algorithm to simplify its implementation. In general, these approximations may negatively affect the delay and/or fairness properties of the scheduler, and the challenge is to optimize the design so that the degradation induced by the approximations is minimized.

Figure 5:
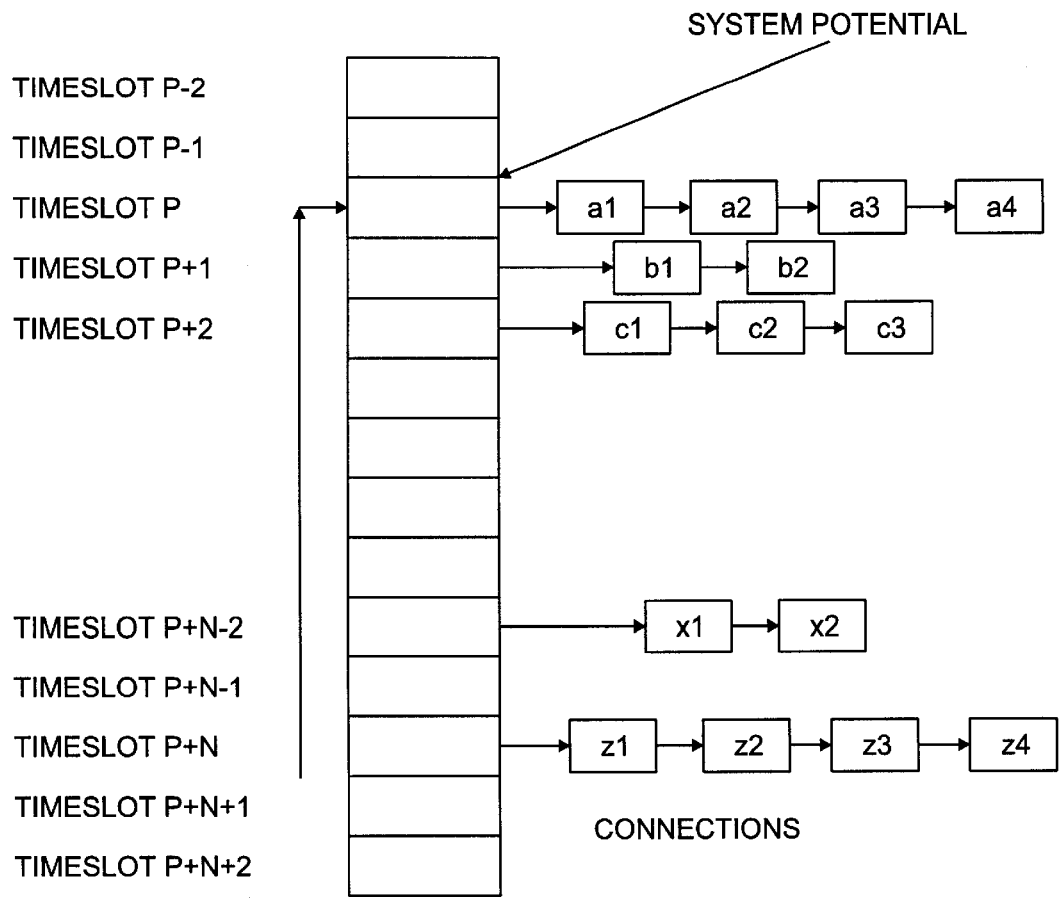
FIG. 5 depicts a schematic diagram of the calendar queue technique.

A well-known technique for implementing the sorting structure is the so-called calendar queue, which has been used in the implementation of Self-Clocked Fair Queuing (SCFQ). The idea behind the calendar queue, schematically shown in FIG. 5, is to use an ordered structure of bins, where the ordering of the bins is physically provided by their position in memory, with one bin associated with each possible value of timestamp in the system; the bins are ordered by increasing value of their corresponding timestamp. Each computed timestamp is assigned to the bin corresponding to its value. The bins are then visited in their order in memory. By construction, when the mechanism visits a bin that is non-empty, the timestamp(s) in that bin is (are) the minimum timestamp(s) in the system. In other words, the idea is to provide a structure in which each position in memory has a direct relation with the value of the timestamps, and use the spatial separation that is achieved by storing the timestamps in the correct bin to perform the sorting.

In practice, each bin is implemented as a list of timestamps, which is commonly served in a First-In-First-Out (FIFO) or a Last-In-First-Out (LIFO) order (in case of the FIFO, each bin consists of two memory pointers, one for the head and one for the tail of the list; in case of the LIFO, only the pointer for the head of the list is sufficient).

Figure 6:
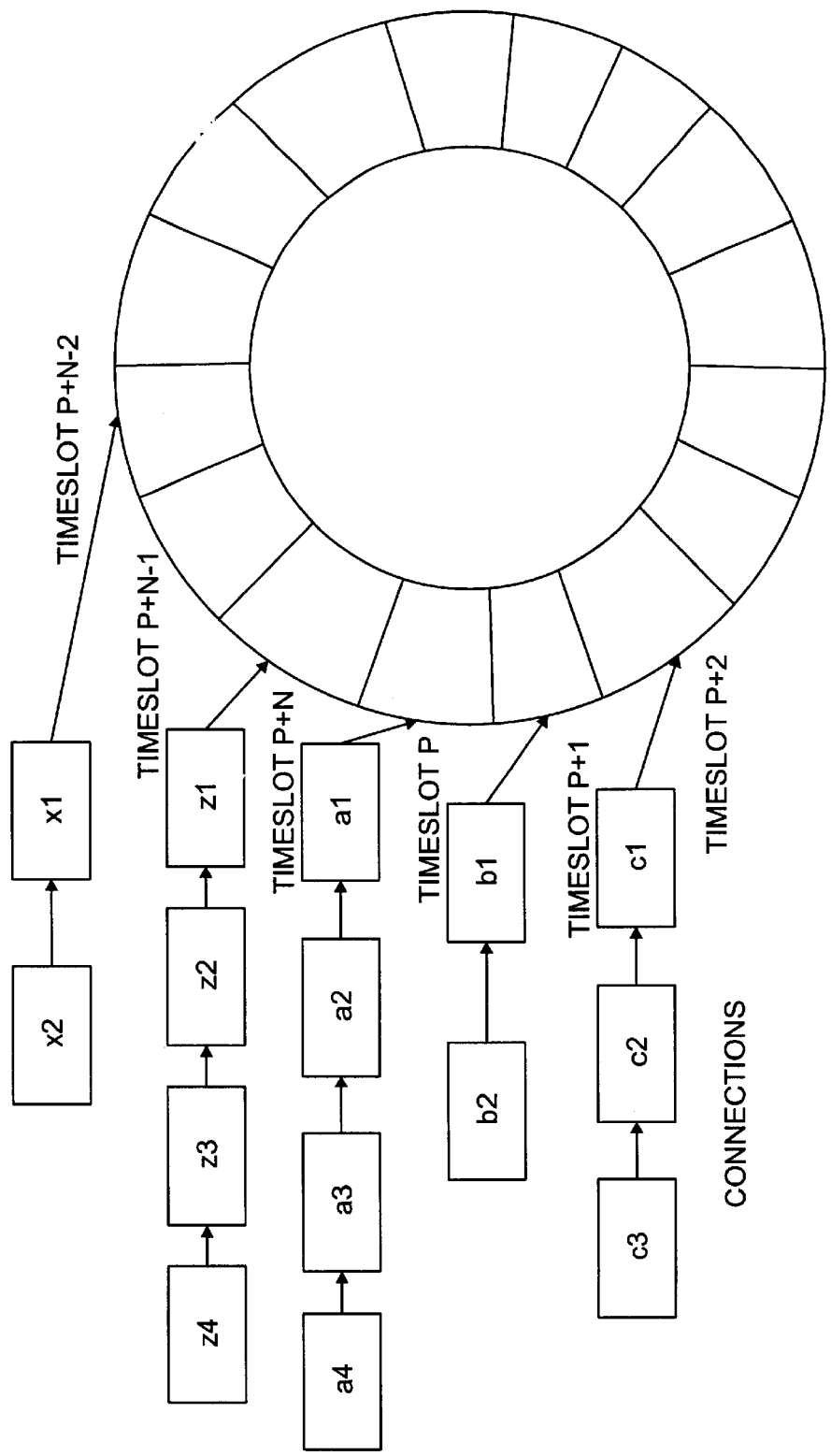
FIG. 6 depicts the result of the fact that the maximum difference between timestamps of backlogged sessions in a calendar queue is bounded, which makes it become a circular queue, enabling bins to be reused as time progresses.

A key observation to make the calendar queue feasible is that at any given time, for any GPS-related scheduler that is "fair", the maximum difference between timestamps of backlogged sessions in the system is bounded. Because of this property, the calendar queue can become a circular queue, so that the bins can be reused as time progresses, as shown in FIG. 6. At any given time, the bin associated with the lower bound of the range of valid timestamp values must correspond with the value of the system potential at that time, and the total number of bins must be sufficient to cover the range of currently valid timestamps.

Among the popular GPS-related schedulers, SCFQ, as described in S. J. Golestani, supra; FFQ, as described in D. Stiliadis et al., supra; Starting Potential Fair Queuing (SPFQ), as described in D. Stiliadis and A. Varma, "Efficient Fair Queuing Algorithms for ATM and Packet Networks," TECHNICAL REPORT UCSC-CRL-95-59, University of California of Santa Cruz, December 1995, which is incorporated herein by reference; and MD-SCFQ, as described in F. M. Chiussi et al., supra, are fair, and the only scheduler that is unfair is Virtual Clock, as described in L. Zhang, supra. The bound on the range of valid timestamps depends on the specific scheduler; for example, in the case of SCFQ for ATM, the bound is equal to $1+1/r_{min}$, where $r_{min}$ is the minimum rate allocated to a session in the system; in the case of SPFQ and MD-SCFQ, the bound is equal to $1+2/r_{min}$.

In ATM, the granularity of interest to represent the timestamps is the timeslot, equal to the duration of transmission of a cell on a link. Accordingly, the calendar queue, to accurately implement the sorting in a GPS-related scheduler, should provide one bin per timeslot, and have as many bins as necessary to cover the possible range of values of the timestamps at any given time; again, with what is typical in current ATM switches, the required size of the calendar queue is very large and, consequently, the required memory is large, so that the implementation of the scheduler remains too expensive. For example, in a system where the scheduler has to operate on a 622 Mbps link, and the minimum supported rate is 1 Kbps, a calendar queue for SCFQ would require more than 0.6M bins, and one for SPFQ or MD-SCFQ would require more than 1.2M bins.

In order to reduce the size of the calendar queue, approximations can be introduced. At least two approaches are conceivable, as described in J. L. Rexford et al., supra: either the granularity with which timestamps are represented is increased, or the scheduling algorithm is modified in such a way that its implementation is simplified.

The first approximation uses a granularity coarser than the timeslot in the representation of the timestamp values. The problem with using coarser granularity is that it may introduce significant alterations in the order of the timestamps with respect to the original scheme with proper granularity, and lead to degradation of the delay properties of the scheduler. In particular, sessions with higher allocated rates would be heavily penalized. In the case of SCFQ, since the delay properties of the scheduler itself are poor, especially for sessions with high service rate, the additional degradation due to the increased granularity is, in relative terms, hardly significant. On the contrary, in the case of algorithms such as FFQ, SPFQ, or MD-SCFQ, which have optimal delay properties, the degradation would be noticeable, and basically compromise the delay bounds that these schemes can achieve.

The second approximation is based on a modification of the scheduler following a hierarchical approach. Sessions with comparable rates are grouped at the first level of the hierarchy; for each group, the arbitration among different sessions is obtained using a calendar queue with drastically reduced size; the size reduction comes from the fact that the range of rates for the sessions in the group is now limited, and the granularity of the queue is optimized accordingly. At the second level of the hierarchy, weights are assigned to each group (defined as the cumulative rate of all backlogged sessions in each group), and the groups are arbitrated for transmission according to their respective weights. Since the number of groups is small, sorting of the timestamps at the second level in the hierarchy is performed without using a calendar queue. The introduction of a hierarchy in the architecture of the scheduler is a source of substantial degradation of the delay guarantees, compared to the initial scheme. In fact, it is well-known that in order to maintain good delay properties with a hierarchical architecture, worst-case fairness should be guaranteed at the higher level of the scheduling hierarchy (at the cost of significant additional complexity). Again, such degradation is not very noticeable in the case of SCFQ, because of the poor delay properties of the scheme itself, but would be very substantial in the case of FFQ, SPFQ, or MD-SCFQ.

MD-SCFQ for ATM Networks

For convenience, described herein is MD-SCFQ, which is the only scheme that achieves optimal delay properties and excellent fairness properties using a system-potential function of O(1) complexity, and is the scheme used herein to describe the LCQ technique of the present invention.

In the ATM case, the system-potential function of MD-SCFQ is updated every timeslot m according to the following rule:

$$P(m) = \max\left(P(m-1) + \frac{1}{r}, \frac{\overline{F}_{B(m)} - n_{B(m)}}{r_{B(m)}}\right) \quad (1)$$

where:

$$\overline{F}_{B(m)} = \sum_{j \in B(m)} F_j r_j$$

is the weighted sum of the timestamps of all sessions that are backlogged at the beginning of timeslot m, each timestamp weighted by the reserved service rate of the corresponding session.

$n_{B(m)}$ is the number of sessions that are backlogged at the beginning of timeslot m;

$$r_{B(m)} = \sum_{j \in B(m)} r_j$$

is the cumulative service rate of all sessions that are backlogged at the beginning of timeslot m.

In the ATM case, the delay bound of MD-SCFQ for a ($b_i$, $r_i$, $p_i$)-leaky-bucket-constrained session i (where $b_i$ is the bucket size, $r_i$ is the arrival rate of the tokens, and $p_i$ is the peak drain rate of the bucket) is:

$$D_i \leq \frac{b_i + l}{r_i} - \frac{r_i}{r^2} \quad (2)$$

The complexity of the system-potential function in MD-SCFQ is of O(1) per cell, since the only operations required to maintain the function are the updates of the accumulators $\overline{F}_B$, $n_B$ and $r_B$ each time the set of timestamps of the backlogged sessions is changed due to the arrival of cells from newly backlogged sessions or to the completion of a transmission. The number of sessions becoming backlogged during a timeslot is limited by the number of physical inputs to the system, and only one session per timeslot is serviced when the system is busy.

The Logarithmic Calendar Queue

The present invention, which we have termed Logarithmic Calendar Queue (LCQ), produces a dramatic reduction in the amount of memory resources necessary to implement a calendar queue, at the cost of minimal and controllable degradation of the delay guarantees of GPS-related schedulers with optimal delay bounds, such as MD-SCFQ.

In the LCQ, the granularity of the calendar queue increases in an optimal way so that the degradation in delay bounds can be controlled, and so that no session is penalized more than any other. The problem in the scheme with increased granularity proposed in J. L. Rexford et al., supra, is that sessions with high service rates are penalized to an extent that is not acceptable in an algorithm achieving optimal delay bounds. In contrast, in the present invention, all sessions, regardless of their rate, experience the same degradation in relative terms.

Figure 7:
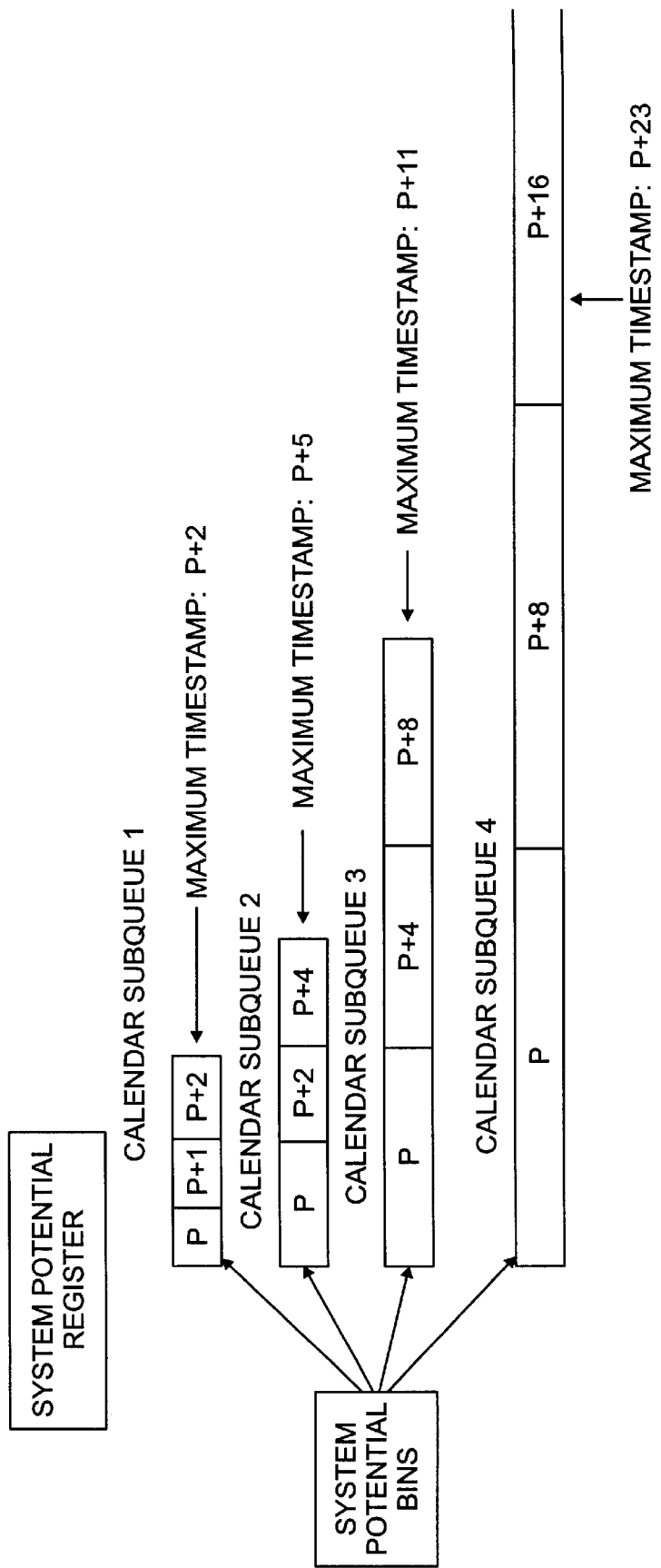
FIG. 7 depicts a schematic diagram of the Logarithmic Calendar Queue (LCQ) according to the present invention.

The LCQ, schematically shown in FIG. 7, consists of a small ordered set of short calendar queues, referred to as calendar subqueues. Each calendar subqueue uses bins of a certain granularity to represent the system potential and timestamps, with granularity that increases with the subqueue index. Overall, the LCQ covers the same range of timestamp values as a calendar queue using bins with granularity of one timeslot (which we refer to as the basic calendar queue), but uses a drastically reduced number of bins (which in turn translates to much smaller memory requirements). The set of subqueues can be viewed as a single calendar queue, where the granularity used to represent the timestamps increases logarithmically with their distance from the system potential at the time when they are computed.

For example, an LCQ consisting of 4 calendar subqueues, each composed of 256 bins, for a total of 1024 bins, with granularity of the subqueues equal to 1, 16, 256 and 4096 timeslots, covers a range of timeslot values that is equal to 256·4096=1048576 (1M) timeslots. The same number of 1M bins would be required to cover the same range with the basic calendar queue. In this example, the LCQ achieves a reduction of three orders of magnitude in the memory requirements.

In the system, all the timestamps are still computed using the timeslot as the measuring unit. Clearly, in the subqueues with granularity greater than 1 timeslot, timestamps of different values (in timeslot) can be placed in the same bin. Then, the timestamps in each bin (a bin is implemented as a list of timestamps) are served in First-In-First-Out (FIFO) order (a Last-In-First-Out (LIFO) order is also possible). Thus, the increased granularity introduces a misordering in the selection of timestamps, which translates in the degradation of the delay properties of the scheduler.

In order to best illustrate and quantify the extent of such a degradation, we use the LCQ to sort the timestamps for a specific GPS-related scheduler, called MD-SCFQ, which is a scheme that achieves optimal delay bounds.

It should be understood that, although not explicitly described herein, the LCQ could be used to sort the timestamps not only for MD-SCFQ but for any packet scheduler that uses timestamps, such as any other GPS-related scheduler.

In MD-SCFQ, the delay bound provided to every session i is strictly related to the corresponding reserved service rate $r_i$ (see equation (2)), and does not depend on the total number of sessions V. (This is not true for SCFQ, where the delay bound contains a term that depends on V, and thus dominates, especially in the case of sessions with higher reserved rates.) In the Logarithmic Calendar Queue, the higher the rate of the session is (and thus the closer a timestamp to the value of the system potential at the time of its assignment is), the finer the granularity of the bin in the calendar subqueue to which the timestamp is appended is; thus, the smaller the degradation with respect to the non-approximated algorithm is. Indeed, as mentioned above, the LCQ aims at equalizing the relative degradation of the delay bounds for all sessions, regardless of their rate.

More formally, let $N_{lcq}$ be the number of calendar subqueues used, and $L_{lcq}$ be the size of the subqueues in bins (here, we describe the case where each subqueue has the same number of bins; the extension to subqueues with different number of bins is straightforward). The choice of the calendar subqueue (and of the bin in that subqueue) to which a new timestamp $F_i^k$ for a session i is appended depends on the difference between $F_i^k$ and the current value of system potential. Specifically, the timestamp $F_i^k$ is appended to a bin in the calendar subqueue $C_Q^j$ whose granularity $G^j$ satisfies the following condition:

$$(L_{lcq} - 1)\frac{G^j}{g} \leq F_i^k - P(h_i^k) < (L_{lcq} - 1)G^j \quad (3)$$

where:

g is the ratio between the granularity of two consecutive subqueues in the ordered set of subqueues that form the LCQ: $G^j = g \cdot G^{j-1}$, $2 \leq j \leq N_{lcq}$; $G^1 = 1$ (here we assume that the granularity of each subqueue is incremented by the same factor g with respect to the previous subqueue, and that the bin granularity in the first subqueue is equal to 1 timeslot; the extension to a more general case is straightforward);

$h_i^k$ is the timeslot at which session i receives the new timestamp $F_i^k$ (this coincides with the timeslot of arrival of packet $c_i^k$ at the head of the corresponding cell queue; it should not be confused with $a_i^k$, the time of arrival of packet $c_i^k$ at the scheduler).

The current value of system potential P(m) corresponds to one bin in each of the calendar subqueues. The location of the bin in calendar subqueue $C_Q^j$ corresponding to the value of the system potential at timeslot m, referred to as $BIN(C_Q^j, P(m))$, is obtained as follows:

$$BIN(C_Q^j, P(m)) = \left[\frac{[P(m)] \bmod L_{lcq} G^j}{G^j}\right] \quad (4)$$

where n=[x] is the maximum integer not greater than x. To get the bin for session i, once the calendar queue has been identified through equation (3), we use the same expression of equation (4), with P(m) replaced by $F_i^k$:

$$BIN(C_Q^j, F_i^k) = \left[\frac{[F_i^k] \bmod L_{lcq} G^j}{G^j}\right] \quad (5)$$

Every timeslot, in order to identify the next connection to be serviced, the first non-empty bin in each subqueue corresponding to the smallest timestamp is visited, and the first timestamp in each of those bins is selected. Then, the smallest timestamp among the $N_{lcq}$ selected timestamps is the one that is chosen for transmission.

One important detail that needs consideration is the fact that the misordering of the transmission sequence induced by granularity coarser than one timeslot in the calendar subqueues can cause the system potential to exceed the timestamps of some of the backlogged sessions. In order to prevent this event from heavily affecting the delay properties of the scheduler, the timestamp assignment rule in any GPS-related scheduler with LCQ must be slightly modified as follows: at timeslot $h_i^k$, when cell $c_i^k$ reaches the head of the queue of session i, the new timestamp of the session is computed as:

$$F_i^k = \begin{cases} F_i^{k-1} + \frac{1}{r_i} & \text{if } Q_i(h_i^k - 1) > 0 \\ \max(F_i^{k-1}, P(h_i^k)) + \frac{1}{r_i} & \text{if } Q_i(h_i^{k-1} - 1) = 0 \end{cases} \quad (6)$$

where $Q_i(m)$ is the queue size of session i at the beginning of timeslot m.

In F. M. Chiussi and A. Francini, "Implementing Fair Queuing in ATM Switches—Part 1: A Practical Methodology for the Analysis of Delay Bounds," PROCEEDINGS OF GLOBECOM '97, November 1997, which is included herein by reference, it has been observed that the loss of the condition on the system potential never exceeding the timestamps of the backlogged sessions requires the use of the modified timestamp-assignment rule of equation (6); without this modification, not only the resulting scheduler would be more difficult to analyze, but also, more importantly, the characteristics of the approximated scheduler would depart radically from those of the initial scheduler, and in particular the delay properties would be compromised.

A closed-form expression of the delay bound $D_{i,lcq}$ for MD-SCFQ with LCQ in the case of a leaky-bucket-constrained session i is:

$$D_{i,lcq} \leq \left[D_i - \left(\frac{r - r_i}{r^2}\right)\right]\left[l + \frac{g}{L_{lcq}}\left(\frac{r - r_i}{r}\right)\right] \quad (7)$$

where $D_i$ is the delay bound of the MD-SCFQ scheme with no approximation, as expressed in equation (2). The relative increase of $D_{i,lcq}$ over $D_i$ is at most (i.e., when $r_i << r$) equal to $g/L_{lcq}$. Referring to the example of LCQ that we have described above, where $N_{lcq}=4$, $L_{lcq}=256$, and $g=16$, this relative amount is equal to 1/16 (or 6.25%). The degradation of the delay properties of MD-SCFQ with LCQ with respect to MD-SCFQ with no approximation can therefore be kept within acceptable levels by properly tuning the design parameters of the subqueues.

The Logarithmic Calendar Queue (LCQ) of the present invention dramatically reduces (by orders of magnitude) the implementation complexity of a GPS-related scheduling algorithm, at the cost of a marginal and controllable degradation of the delay bounds. The LCQ can be viewed as a calendar queue where the bins used to sort the timestamps have a granularity that increases in such a way that the relative degradation in delay bounds is the same for all sessions, regardless of their rate, and is controllable by properly choosing the design parameters of the LCQ.

The LCQ above has been applied to implement the MD-SCFQ with reduced complexity. However, the LCQ is not exclusively related to MD-SCFQ, but can be applied to any GPS-related scheduler to simplify implementation complexity with only marginal degradation of the delay properties.

System Overview

FIG. 1 depicts a packet switched network in which switches 1-1 through 1-p are connected to each other by several communication links. Several data sources 2-1 through 2-q are also connected to the switches 1-1 through 1-p. A network connection is established from each of the data sources to a corresponding destination 3-1 through 3-q, and data packets are transmitted from each data source to the corresponding destination.

Figure 2:
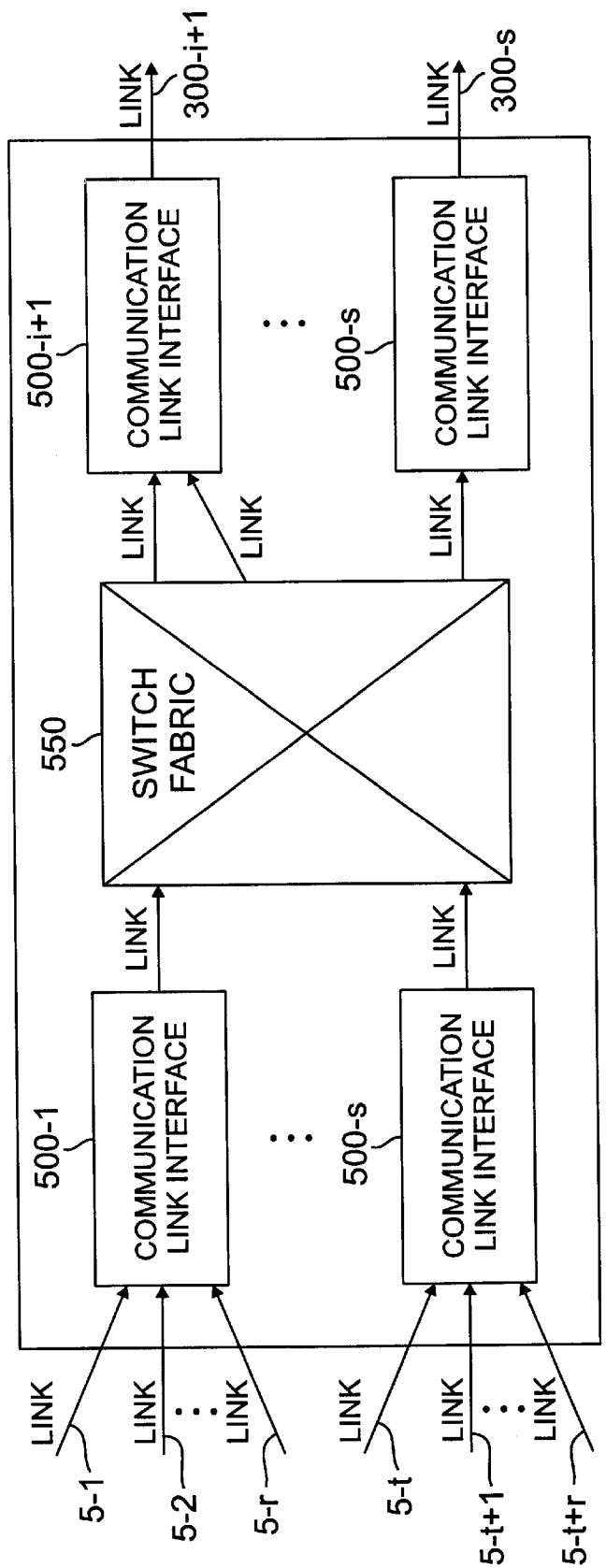
FIG. 2 depicts a communication switch in the packet network of FIG. 1.

FIG. 2 depicts one of the switches 1-1 through 1-p in further detail. The switch includes communication link interfaces 500-1 through 500-s. Each of the communication link interfaces connects multiple input links to an output link. The communication link interface receives the data packets associated with corresponding network connections from the input links and transmits them to the output link. As depicted in FIG. 2, the switch may include one or multiple communication link interfaces 500. For example, the communication link interface 500 may be in front of the switch fabric 550, in which case the input links of the communication link interface 500 may be multiple input links of the switch, and the output link of the communication link interface 500 connects to the switch fabric 550.

Alternatively, the communication link interface 500 may be at the output of the switch fabric 550, in which case the input links of the communication link interface may be multiple output links of the switch fabric 550, and the output link of the communication link interface may be one of the output links of the switch.

Figure 3:
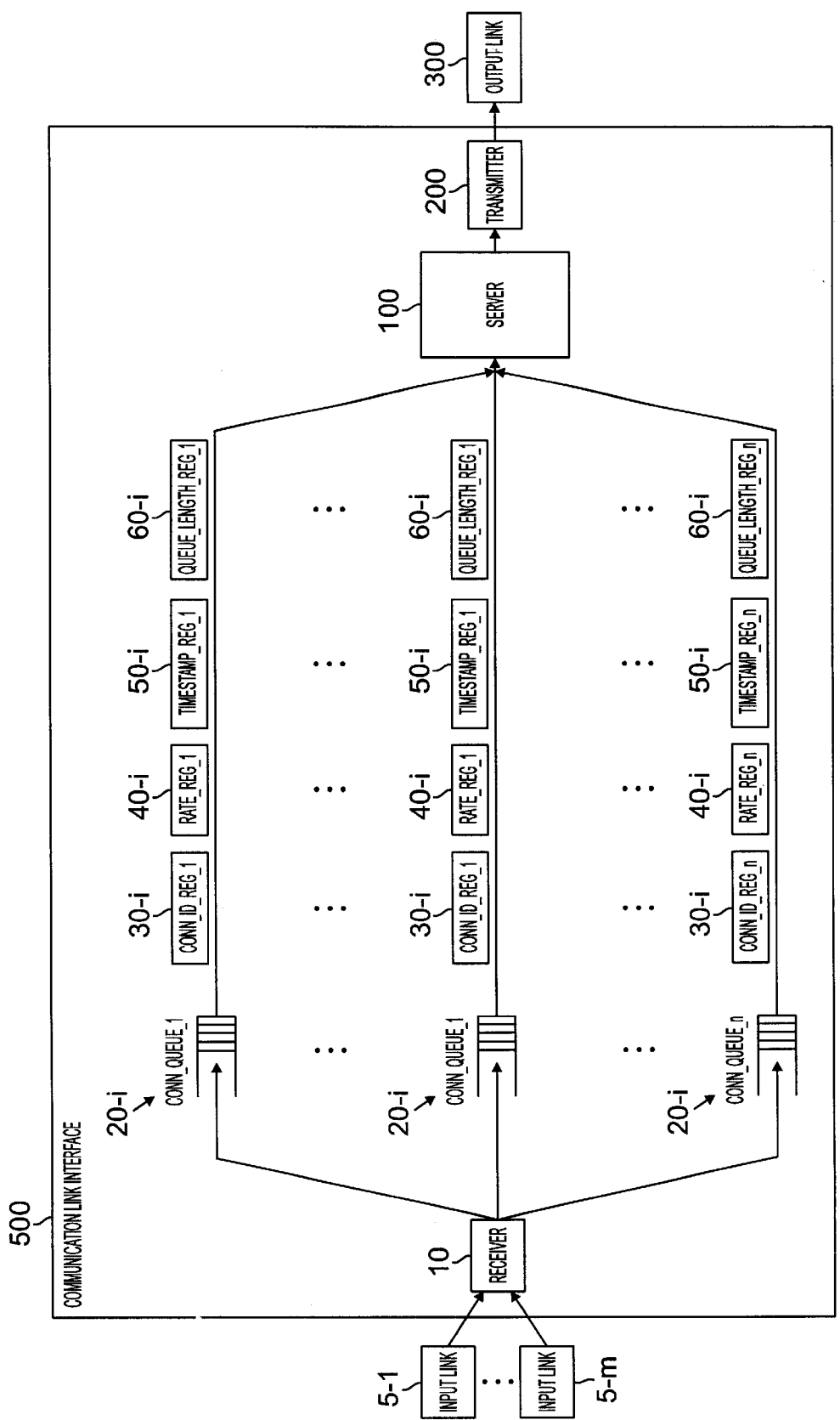
FIG. 3 depicts a block diagram of a communication link interface according to one embodiment of the present invention for scheduling the transmission of data packets in a communication link.

FIG. 3 depicts a block diagram of an apparatus or communication link interface 500 according to one illustrative embodiment of the present invention. The communication link interface 500 includes a data packet receiver 10, which receives the data packets arriving from input links 5-1 through 5-m. Receiver 10 uses the contents of a connection identifier field contained in the header of each packet (not shown) to identify its respective connection i. In this embodiment, all packets that the receiver 10 receives have the same length. For example, this is the case when the switch that contains the communication link interface is connected to an Asynchronous Transfer Mode (ATM) network. For each packet, the receiver 10 also determines, at the time of receiving a packet, whether or not the packet can be queued. If the packet is accepted, then the receiver 10 stores the packet in the appropriate connection queue 20-i. Server 100 (described below), in response to that action, increments the queue length register 60-i associated with the identified queue; otherwise, if receiver 10 determines that the packet cannot be queued, the packet is discarded.

For each connection i of the switched connections 1 through n, the communication link interface 500 includes (a) a connection queue 20-i, which may be, for example, a so-called First-In-First-Out (FIFO) queue, used to store the received data packets of connection i, (b) a connection identifier register 30-i, used to store the local identifier of connection i, (c) a rate register 40-i, used to store the value of data transfer rate reserved to connection i, (d) a timestamp register 50-i, used to store the timestamp of connection i, and (e) a queue length register 60-i, used to store the number of data packets of connection i that are currently in the communication link interface 500 (including the transmitter 200). When a packet associated with connection i is being transmitted by transmitter 200, the timestamp of connection i is the timestamp of that packet. Also, when connection queue 20-i is not empty and the transmitter 200 is not transmitting a packet associated with connection i, the timestamp of connection i is the timestamp of the packet at the head of connection queue 20-i. Further, when connection queue 20-i is empty and the transmitter 200 is not transmitting a packet associated with connection i, the timestamp of connection i is the timestamp of the last transmitted packet of connection i.

Server 100 generates a new timestamp for connection i every time a new packet reaches the head of the associated connection queue 20-i, and stores the value of the newly-generated timestamp in timestamp register 50-i. Every time the transmitter 200 becomes available for the transmission of a new packet, server 100 selects a data packet from among all the packets waiting at the head of the queues associated with all the connections that are backlogged at the time of such availability, and sends the selected packet to the transmitter 200. The assignment of a new timestamp to a connection i is based on the following rules, which depend on whether or not the connection i was backlogged before the new packet arrived at the head of connection queue 20-i.

If connection i was not backlogged before the packet arrived at the head of connection queue 20-i, meaning that connection i becomes backlogged because of the arrival of the new packet, then the new timestamp of connection i is generated according to the following expression:

$$F_i^k = \max(F_i^{k-1}, P(h_i^k)) + \frac{1}{r_i} \quad (8)$$

where $F_i^k$ is the timestamp assigned to the k-th data packet of connection i ($F_i^o = 0$), $h_i^k$ is the time of arrival of the k-th data packet of connection i at the head of connection queue 20-i, $P(h_i^k)$ is the value of the system potential at time $h_i^k$ and is maintained by server 100 (an example of definition of such a system-potential function is given above, in the description of MD-SCFQ), and $r_i$ is the data transfer rate allocated to connection i, normalized to the rate of server 100.

If connection i was backlogged before the packet arrived at the head of connection queue 20-i, meaning that the new packet has arrived at the head of connection queue 20-i as a result of transmitter 200 having just transmitted another packet of connection i, then the new timestamp of connection i is assigned according to the following equation:

$$F_i^k = F_i^{k-1} + \frac{1}{r_i} \quad (9)$$

where $F_i^{k-1}$ is the timestamp assigned to the (k-1)-th data packet of connection i.

At the end of the transmission of the j-th packet in the system, the system-potential function P appearing in equation (8) and maintained by server 100 is updated according to the definition of system potential adopted. For example, in the case of MD-SCFQ, the system potential is updated according to the following equation:

$$P(j) = \max\left(P(j-1) + \frac{1}{r}, \frac{\overline{F}_{B(j)} - n_{B(j)}}{r_{B(j)}}\right) \quad (10)$$

where $$\overline{F}_{B(j)} = \sum_{i \in B(j)} F_i r_i$$

is the weighted sum of the timestamp values $F_i$ that are stored in the timestamp registers 50-i of all the backlogged connections $i \in B(j)$ at the end of the transmission of the j-th packet in the system (in the weighted sum, the weight of each timestamp value $F_i$ is the reserved data transfer rate $r_i$ of the corresponding connection i; the value of $r_i$ is stored in rate register 40-i); $n_{B(j)}$ is the number of all the connections $i \in B(j)$ that are backlogged at the end of the transmission of the j-th packet in the system; and $$r_{B(j)} = \sum_{i \in B(j)} r_i$$

is the sum of the values that are stored in the rate registers 40-i, computed over all the backlogged connections $i \in B(j)$.

Server 100 determines the system-potential function each time a transmission is completed.

Whenever transmitter 200 is available for the transmission of a new/next data packet, then server 100 selects the next connection i to be serviced. The server 100 selects connection i if: (a) connection i is appended to the first non-empty bin of the corresponding subqueue, (b) connection i is at the head of the list of connections appended to the bin, according to the service policy adopted (either First- In-First-Out (FIFO) or Last-In-First-Out (LIFO)), and (c) the timestamp $F_i$ of connection i is minimum among the timestamps of the connections selected in the other subqueues, with at most one connection per subqueue.

When a connection i is selected for transmission by server 100, then the data packet at the head of the corresponding connection queue 20-i is unloaded from that queue and supplied to the transmitter 200.

When the transmitter 200 completes the transmission over the output link 300 of a packet belonging to connection i, server 100 decrements the content of the queue length register 60-i. If the decremented value stored in queue length register 60-i is greater than zero, then server 100 generates the new timestamp of connection i. Then server 100 updates the system-potential function P according to equation (10) using (a) the value of the newly-generated timestamp of connection i, (b) the previous value of the timestamp of connection i stored in timestamp register 50-i, and (c) the value in rate register 40-i. Then, server 100 removes the previous value in timestamp register 50-i, and stores the value of the newly-generated timestamp of connection i in the timestamp register 50-i. If the decremented value stored in queue length register 60-i is zero, then server 100 updates the system-potential function P according to equation (10), using (a) the content of timestamp register 50-i and (b) the content of rate register 40-i.

Figure 4:
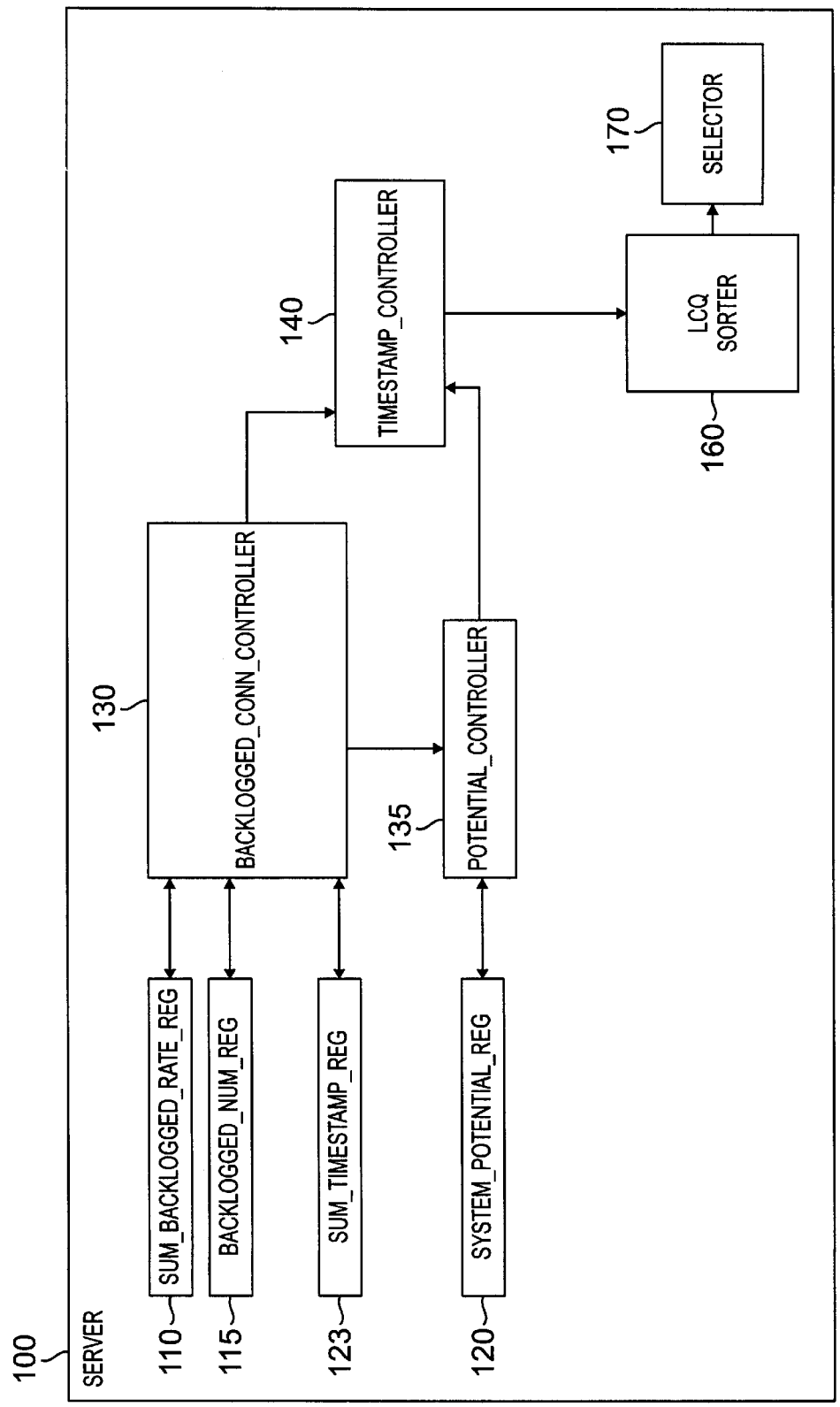
FIG. 4 depicts a block diagram of a server that is included in the communication link interface of FIG. 3.

FIG. 4 depicts an apparatus or server 100 according to one illustrative embodiment of the present invention.

The illustrative embodiment of server 100 includes (a) a register 10, for storing the sum of the reserved data transfer rates of all backlogged connections (the content of register 110 is called $r_{B(j)}$ in equation (10) above); (b) a register 115, for storing the number of backlogged connections (the content of register 115 is called $n_{B(j)}$ in equation (10) above); (c) a register 120, for storing the current value of the system-potential function (the content of register 120 is called P in equations (8) and (10) above); and (d) a register 123, for storing the weighted sum of the timestamps of all backlogged connections (the content of register 123 is called $\overline{F}_{B(j)}$ in equation (10)). Server 100 also includes (a) a controller 130, which (i) updates the contents of registers 110, 115, and 123, (ii) supplies the content of registers 110, 115, and 123 to controller 135, and (iii) supplies to controller 140 the previous/old value of the timestamp stored in the timestamp register 50-i of connection i for which a new timestamp must be computed; (b) a controller 135, which determines the value of the system potential according to equation (10) each time a transmission of a packet associated with connection i in the system is completed by transmitter 200, using the content of registers 110, 115, 120, 123, and 50-i, and the new value of the timestamp of connection i; and (c) a controller 140, which determines the timestamp to be assigned to connection i when a new packet arrives at the head of its connection queue 20-i, according to (i) equation (8), if connection i was not backlogged before the new packet arrived at the head of connection queue 20-i, and (ii) equation (9), if connection i was already backlogged before the new packet arrived at the head of the connection queue 20-i.

Server 100 further includes the LCQ sorter 160 and a selector 170. At any time the transmitter becomes available for a new transmission of a data packet, the LCQ sorter 160 supplies the identifier of the next backlogged connection i to be serviced. The selector 170 removes from connection queue 20-i the packet that is at the head of connection queue 20-i corresponding to connection i, whose identifier has been supplied by the LCQ sorter 160, and supplies the packet to the transmitter 200.

Flow Chart

Figure 8A:
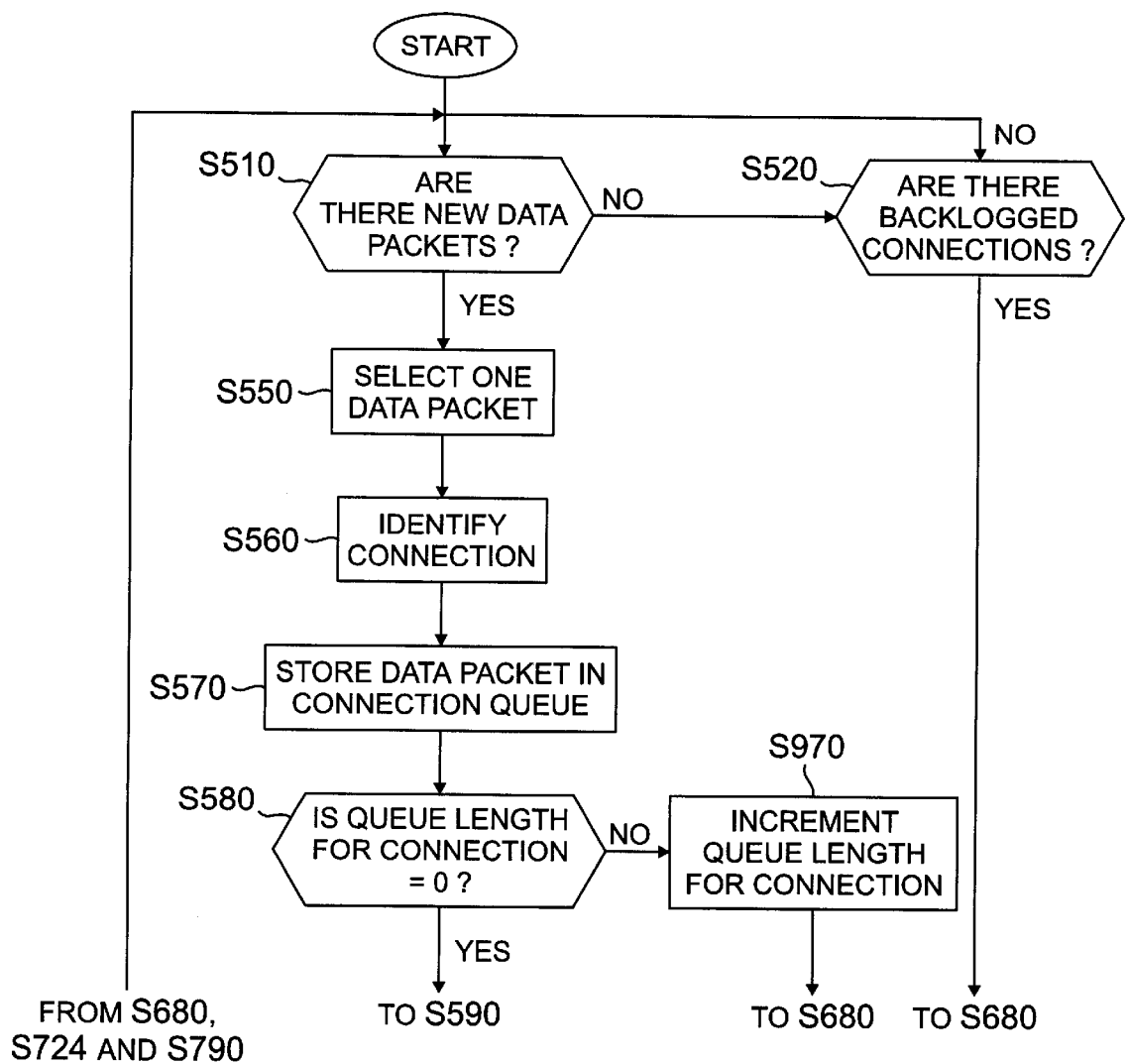
FIGS. 8A–C depict in flowchart form a first method of scheduling the transmission of data packets in a communication link interface of FIG. 3 according to the present invention.
Figure 8B:
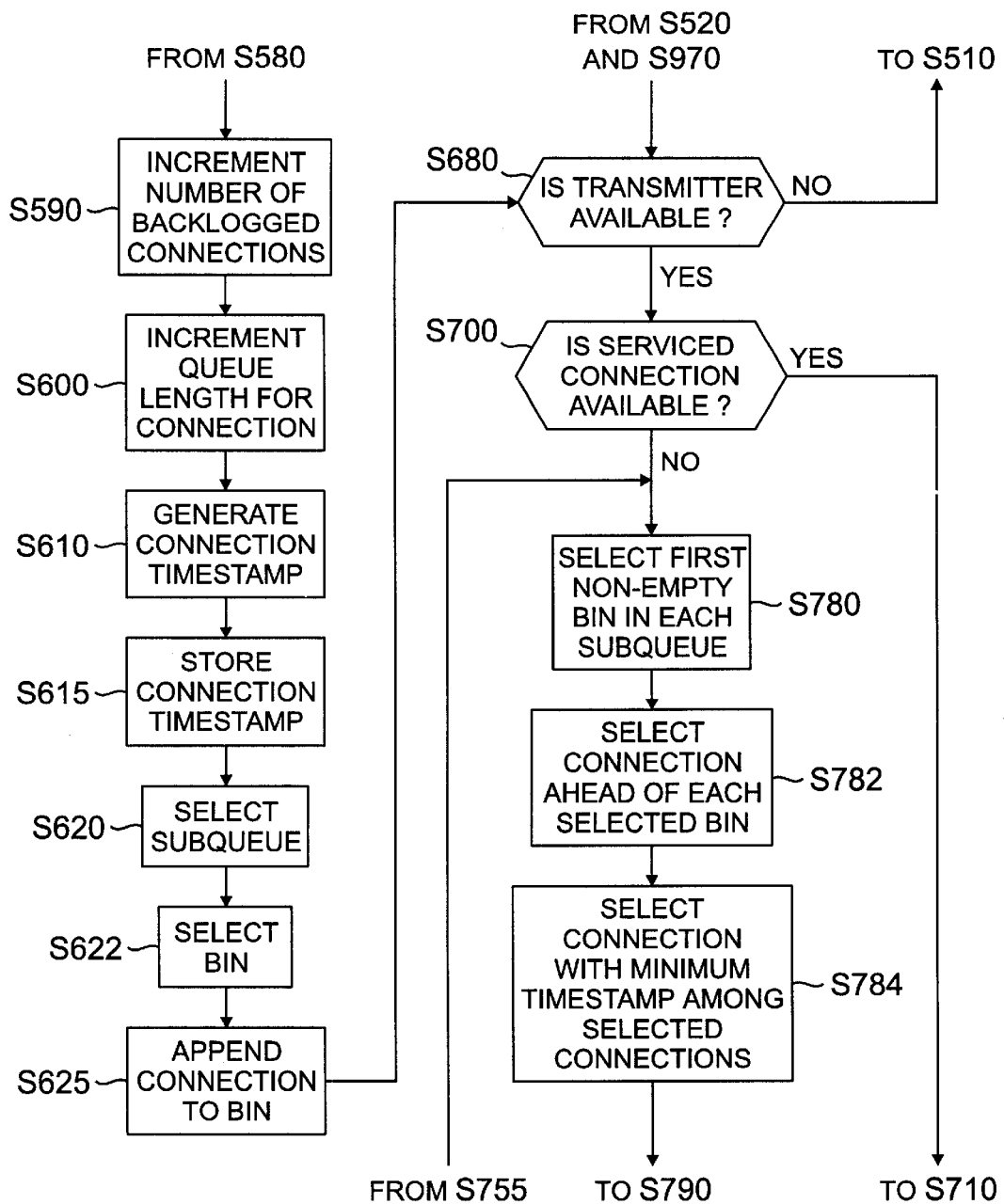
Figure 8C:
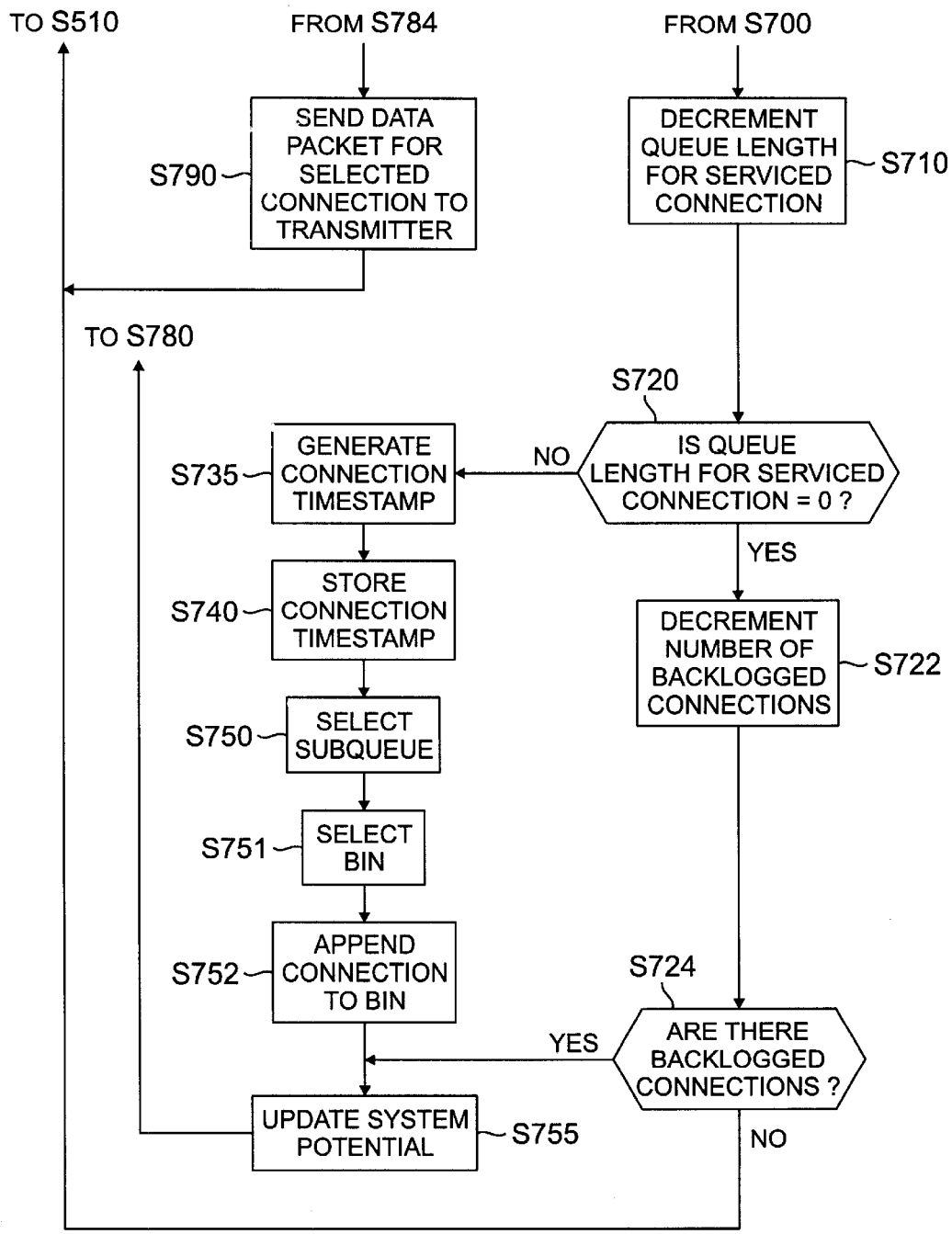
Figure 9:
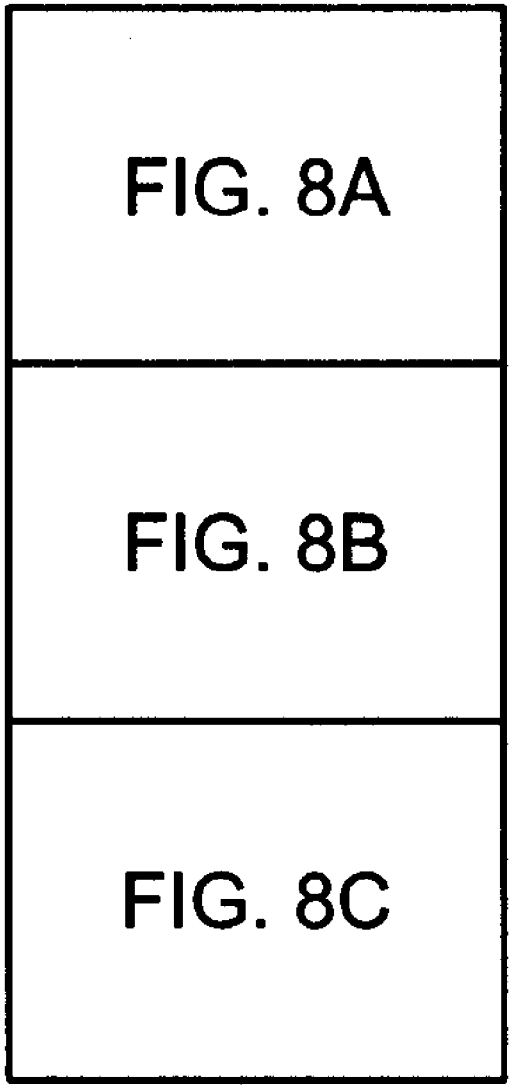
FIG. 9 depicts the order in which FIGS. 8A–C should be arranged with respect to one another.

FIGS. 8A through 8C (which are arranged relative to one another as shown in FIG. 9) describe in flow chart form an illustrative embodiment of the operation of server 100 that implements one method of scheduling the transmission of data packets of fixed size according to the present invention.

Referring to FIGS. 8A–C, in step S510, if new data packets have arrived at the receiver 10, then server 100 proceeds to step S550, otherwise server 100 proceeds to step S520.

In step S520, if no backlogged connections are available (which is indicated by the content of register 115 being equal to zero), server 100 then returns to the start and tests for new data packets. Otherwise, server 100 proceeds to step S680.

If there are new data packets determined in step S510, then server 100 selects one data packet in step S550 and proceeds to step S560.

Next, in step S560 the connection of the new data packet is identified, and the process moves to step S570.

In step S570, the selected data packet is stored in the identified connection queue. The process proceeds to step S580.

In step S580, the queue length is tested for the identified connection. If the queue length is zero, the process proceeds to step S590. If the queue length is not zero, i.e., there are data packets in the queue for the identified connection, then the process moves to step S970.

In step S970, the queue length for the identified connection is incremented by one. The process then moves to step S680.

If the queue length tested in step S580 is zero, then the process moves to step S590, in which the number of backlogged connections is incremented by one. The process then moves to step S600.

In step S600, the queue length for the identified connection is incremented by one. The process then moves to step S610.

In step S610, the connection timestamp is generated, according to equation (8). The process then moves to step S615.

In step S615, the connection timestamp is stored. The process then moves to step S620.

In step S620, the destination subqueue of the connection is selected according to equation (3). The process then moves to step S622.

In step S622, the destination bin of the connection is selected according to equation (5). The process then moves to step S625.

In step S625, the connection is appended to the selected bin. The process then moves to step S680.

In step S680, the server 100 tests for the availability of the transmitter 200. If the transmitter 200 is not available because the transmission of a packet is in progress, the process returns to step S510 and waits for the arrival of new packets. If the transmitter is available, the process moves to step S700.

In step S700, the server 100 tests whether a serviced connection is available. If a serviced connection is available, i.e., a service has just been completed, the process moves to step S710. If there is no serviced connection available, the process moves to step S780.

In step S780, the server 100 selects the first non-empty bin in each subqueue. The process then moves to step S782.

In step S782, the server 100 selects the connections at the head of each selected bin. The process then moves to step S784.

In step S784, the server 100 selects the connection with the minimum timestamp among the connections selected in step S782. The process then moves to step S790.

In step S790, the data packet at the head of the packet FIFO queue for the connection selected in step S784 is sent to the transmitter. The process then moves to step S510 and waits for new data packets.

In step S710, to which the process moves from step S700 if there is a serviced connection available, the queue length is decremented for the serviced connection. The process then moves to step S720.

In step S720, the server 100 tests whether the queue length for the connection is zero. If the queue length for the connection is zero, then the process moves to step S722. If the queue length for the connection is not zero, then the process moves to step S735.

In step S722, the number of backlogged connections is decremented by one. The process then moves to step S724.

In step S724, the server 100 tests whether there are backlogged connections. If there are no backlogged connections, the process moves to step S510, and waits for new data packets. If there are backlogged connections the process moves to step S755.

In step S735, to which the process moves if the queue length is not zero in step S720, a new connection timestamp is generated using equation (9). The process then moves to step S740.

In step S740, the connection timestamp is stored. The process then moves to step S750.

In step S750, the destination subqueue of the just serviced connection is selected according to equation (3). The process then moves to step S751.

In step S751, the destination bin of the just serviced connection is selected according to equation (5). The process then moves to step S752.

In step S752, the just serviced connection is appended to the selected bin. The process then moves to step S755.

In step S755, the system potential is updated according to equation (10). The process then moves to step S780.

While the above description relates to packets of fixed lengths, the above description of FIGS. 8A–C should make apparent to those of skill in the art the modifications to FIGS. 9A–9C in U.S. patent application Ser. No. 08/959,362 necessary to conform the present invention to a system having variable packet lengths, to which the present invention is equally applicable.

What is claimed is:

1. A method of servicing, at a predetermined service rate, a plurality of queues containing data packets, each of said queues being associated with respective connections, said connections traversing an associated communication switch, each of said connections being allocated a respective data transfer rate, said method comprising the steps of:

responsive to receiving a plurality of data packets via a plurality of data links identifying for each received data packet the respective one of said connections and identifying the associated one of said queues;

storing each of the received data packets in one of said plurality of queues;

associating a timestamp with each connection whose associated queue has at least one data packet waiting therein, in which said connection is identified as a backlogged connection, and generating a timestamp associated with each connection each time a new data packet reaches the head of the associated queue;

storing in memory the timestamps associated with respective ones of the backlogged connections;

sorting the timestamps using a plurality of calendar subqueues, each of said calendar subqueues being associated with a respective specified granularity and comprising a plurality of bins, each of said bins being associated with an interval of values of timestamps according to the respective granularity of the calendar subqueue, and each of said bins comprising a queue of connections whose respective timestamps have values within the interval associated with the bin;

selecting for each backlogged connection one of the said calendar subqueues and one of the bins in the selected calendar subqueue according to the value of the associated timestamp each time a new data packet reaches the head of the associated queue of the corresponding connection;

appending said backlogged connection to the queue of connections in the selected bin in the selected calendar subqueue;

generating a value for the system potential according to a predetermined function, and identifying the bin in each calendar subqueue associated with the value of the system potential;

identifying, for each of the calendar subqueues, the first non-empty bin whose minimum associated timestamp value is not smaller than the minimum timestamp value associated with the bin associated with the value of system potential in said calendar subqueue;

determining for each of the identified non-empty bins the connection at the head of the corresponding queue of connections, and identifying the value of the timestamp associated with said connection;

selecting the minimum value of the identified timestamps, removing a data packet from the head of that one of the queues associated with the connection corresponding to said minimum value, and transmitting the removed data packet to an output;

wherein the subqueue to which the backlogged connection is appended is selected as the subqueue associated with the smallest granularity for which the granularity times the number of bins decremented by one is larger than the difference between the value of the timestamp associated with the backlogged connection and the value of the system potential;

wherein the bin in the selected subqueue to which the backlogged connection is appended is selected as the one associated with the result of the modulo operation between the value of the timestamp and the granularity times the number of bins, in which said result is then divided by the granularity.

2. The method of claim 1, wherein the value of the system potential used to compute the timestamps is associated with each backlogged connection.

3. The method of claim 1, where the backlogged connection is appended at the head of the queue associated with the selected bin.

4. The method of claim 1, where the backlogged connection is appended at the tail of the queue associated with the selected bin.

5. The method of claim 1, in which the timestamp associated with a backlogged connection, generated each time a new data packet reaches the head of the associated queue, is generated as a maximum value between a previous value of the timestamp assigned to the connection and a current value of the system potential, said maximum value incremented by the inverse of the data transfer rate allocated to the connection normalized to the rate of the server, if the connection associated with the data packet is not backlogged before the packet reaches the head of the associated queue, and in which the timestamp associated with a backlogged connection, generated each time a new data packet reaches the head of the associated queue, is generated as the previous value of the timestamp assigned to the connection incremented by the inverse of the data transfer rate allocated to the connection normalized to the rate of the server, if the connection associated with the data packet is backlogged before the packet reaches the head of the associated queue.

6. The method of claim 1, further comprising the step of providing that the granularity of the plurality of calendar subqueues increases by a predefined factor for each of the calendar subqueues.

7. The method of claim 6, wherein the value of the system potential is used to compute the timestamps associated with each backlogged connection.

8. The method of claim 6, where the backlogged connection is appended at the head of the queue associated with the selected bin.

9. The method of claim 6, where the backlogged connection is appended at the tail of the queue associated with the selected bin.

10. The method of claim 6, in which the timestamp associated with a backlogged connection, generated each time a new data packet reaches the head of the associated queue, is generated as a maximum value between a previous value of the timestamp assigned to the connection and a current value of the system potential, said maximum value incremented by the inverse of the data transfer rate allocated to the connection normalized to the rate of the server, if the connection associated with the data packet is not backlogged before the packet reaches the head of the associated queue, and in which the timestamp associated with a backlogged connection, generated each time a new data packet reaches the head of the associated queue, is generated as the previous value of the timestamp assigned to the connection incremented by the inverse of the data transfer rate allocated to the connection normalized to the rate of the server, if the connection associated with the data packet is backlogged before the packet reaches the head of the associated queue.

11. The method of claim 1, in which the granularity of the first calendar subqueue of the plurality of calendar subqueues is equal to one timeslot.

12. The method of claim 11, wherein the value of the system potential is used to compute the timestamps associated with each backlogged connection.

13. The method of claim 11, where the backlogged connection is appended at the head of the queue associated with the selected bin.

14. The method of claim 11, where the backlogged connection is appended at the tail of the queue associated with the selected bin.

15. The method of claim 11, in which the timestamp associated with a backlogged connection, generated each time a new data packet reaches the head of the associated queue, is generated as a maximum value between a previous value of the timestamp assigned to the connection and a current value of the system potential, said maximum value incremented by the inverse of the data transfer rate allocated to the connection normalized to the rate of the server, if the connection associated with the data packet is not backlogged before the packet reaches the head of the associated queue, and in which the timestamp associated with a backlogged connection, generated each time a new data packet reaches the head of the associated queue, is generated as the previous value of the timestamp assigned to the connection incremented by the inverse of the data transfer rate allocated to the connection normalized to the rate of the server, if the connection associated with the data packet is backlogged before the packet reaches the head of the associated queue.

16. An apparatus for servicing, at a predetermined service rate, a plurality of queues containing data packets, each of said queues being associated with respective connections, said connections traversing an associated communication switch, each of said connections being allocated a respective data transfer rate, said apparatus comprising:

memory forming the plurality of queues associated with respective ones of said connections, a receiver for receiving a plurality of data packets via a plurality of data links, for identifying for each received data packet the respective one of said connections, and identifying the associated one of said queues, and for storing each of the received data packets in its respective identified queue, a first controller for associating a timestamp with each connection whose associated queue has at least one data packet waiting therein, in which said connection is identified as a backlogged connection, and generating a timestamp associated with each connection each time a new data packet reaches the head of the associated queue, a sorter for sorting the timestamps using a plurality of calendar subqueues, each of said calendar subqueues being associated with a respective specified granularity and comprising a plurality of bins, each of said bins being associated with an interval of values of timestamps according to the respective granularity of the calendar subqueue, and each of said bins comprising a queue of connections whose respective timestamps have values within the interval associated with the bin, a first selector for selecting for each backlogged connection one of the said calendar subqueues and one of the bins in the selected calendar subqueue according to the value of the associated timestamp each time a new data packet reaches the head of the associated queue of the corresponding connection, and for appending said backlogged connection to the queue of connections in the selected bin in the selected calendar subqueue, a second controller generating a value for the system potential according to a predetermined function, and for identifying the bin in each calendar subqueue associated with the value of the system potential, a second selector for identifying, for each of the calendar subqueues, the first non-empty bin whose minimum associated timestamp value is not smaller than the minimum timestamp value associated with the bin associated with the value of system potential in said calendar subqueue, for determining for each of the identified non-empty bins the connection at the head of the corresponding queue of connections, and for identifying the value of the timestamp associated with said connection, a third selector for selecting the minimum value of the identified timestamps, and a transmitter for removing a data packet from the head of that one of the queues associated with the connection corresponding to said minimum value, and transmitting the removed data packet to an output;

said first selector selecting the subqueue as the subqueue associated with the smallest granularity for which the granularity times the number of bins decremented by one is larger than the difference between the value of the timestamp associated with the backlogged connection and the value of the system potential;

and selecting the bin in the selected subqueue as the one associated with the result of the modulo operation between the value of the timestamp and the granularity times the number of bins, in which said result is then divided by the granularity.

17. The apparatus of claim 16, wherein the value of the system potential is used to compute the timestamps associated with each backlogged connection.

18. The apparatus of claim 16, wherein the backlogged connection is appended at the head of the queue associated with the selected bin.

19. The apparatus of claim 16, wherein the backlogged connection is appended at the tail of the queue associated with the selected bin.

20. The apparatus of claim 16, wherein the first controller further includes apparatus operative when the connection associated with the data packet is not backlogged before the packet reaches the head of the associated queue for then generating the timestamp associated with the backlogged connection, each time a new data packet reaches the head of the associated queue, as a maximum value between a previous value of the timestamp assigned to the connection and a current value of the system potential, said maximum value incremented by the inverse of the data transfer rate allocated to the connection normalized to the rate of the server, operative when the connection associated with the data packet is backlogged before the packet reaches the head of the associated queue for then generating the timestamp associated with a backlogged connection, each time a new data packet reaches the head of the associated queue, as the previous value of the timestamp assigned to the connection incremented by the inverse of the data transfer rate allocated to the connection normalized to the rate of the server.

21. The apparatus of claim 16, further comprising the step of providing that the granularity of the plurality of calendar subqueues increases by a predefined factor for each of the calendar subqueues.

22. The apparatus of claim 21, wherein the value of the system potential is used to compute the timestamps associated with each backlogged connection.

23. The apparatus of claim 21, wherein the backlogged connection is appended at the head of the queue associated with the selected bin.

24. The apparatus of claim 21, wherein the backlogged connection is appended at the tail of the queue associated with the selected bin.

25. The apparatus of claim 21, wherein the first controller further includes apparatus operative when the connection associated with the data packet is not backlogged before the packet reaches the head of the associated queue for then generating the timestamp associated with the backlogged connection, each time a new data packet reaches the head of the associated queue, as a maximum value between a previous value of the timestamp assigned to the connection and a current value of the system potential, said maximum value incremented by the inverse of the data transfer rate allocated to the connection normalized to the rate of the server, operative when the connection associated with the data packet is backlogged before the packet reaches the head of the associated queue for then generating the timestamp associated with a backlogged connection, each time a new data packet reaches the head of the associated queue, as the previous value of the timestamp assigned to the connection incremented by the inverse of the data transfer rate allocated to the connection normalized to the rate of the server.

26. The apparatus of claim 16, in which the granularity of the first calendar subqueue of the plurality of calendar subqueues is equal to one timeslot.

27. The apparatus of claim 26, wherein the value of the system potential is used to compute the timestamps associated with each backlogged connection.

28. The apparatus of claim 26, wherein the backlogged connection is appended at the head of the queue associated with the selected bin.

29. The apparatus of claim 26, wherein the backlogged connection is appended at the tail of the queue associated with the selected bin.

30. The apparatus of claim 26, wherein the first controller further includes apparatus operative when the connection associated with the data packet is not backlogged before the packet reaches the head of the associated queue for then generating the timestamp associated with the backlogged connection, each time a new data packet reaches the head of the associated queue, as a maximum value between a previous value of the timestamp assigned to the connection and a current value of the system potential, said maximum value incremented by the inverse of the data transfer rate allocated to the connection normalized to the rate of the server, operative when the connection associated with the data packet is backlogged before the packet reaches the head of the associated queue for then generating the timestamp associated with a backlogged connection, each time a new data packet reaches the head of the associated queue, as the previous value of the timestamp assigned to the connection incremented by the inverse of the data transfer rate allocated to the connection normalized to the rate of the server.

* * * * *